United States Patent
Rupaner et al.

(10) Patent No.: US 6,444,760 B1
(45) Date of Patent: Sep. 3, 2002

(54) METHOD OF REDUCING THE CONTENT OF RESIDUAL MONOMERS IN AQUEOUS POLYMER DISPERSIONS

(75) Inventors: Robert Rupaner, Ellerstadt; Gerhard Bauer, Weinheim; Sven Lawrenz, Mannheim; Claudia Heibel, Weinheim; Johannes Dobbelaar, Wachenheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/508,104

(22) PCT Filed: Sep. 17, 1998

(86) PCT No.: PCT/EP98/05928

§ 371 (c)(1),
(2), (4) Date: Mar. 17, 2000

(87) PCT Pub. No.: WO99/14249

PCT Pub. Date: Mar. 25, 1999

(30) Foreign Application Priority Data

Sep. 18, 1997 (DE) .......................... 197 41 187

(51) Int. Cl.⁷ .................................. C08F 6/00
(52) U.S. Cl. .................... 525/370; 525/371; 525/329.1; 525/329.2; 525/329.7; 525/330.2; 525/330.3; 525/332.9

(58) Field of Search ................................. 525/370, 371, 525/329.1, 329.2, 329.7, 330.2, 330.3, 332.9

(56) References Cited

U.S. PATENT DOCUMENTS

| | | | |
|---|---|---|---|
| 4,242,500 A | | 12/1980 | Franceschini |
| 4,278,582 A | | 7/1981 | Miller |
| 4,360,632 A | | 11/1982 | Pinschmidt, Jr. et al. |
| 4,361,687 A | | 11/1982 | Arndt et al. |
| 4,833,199 A | | 5/1989 | Hoppe et al. |
| 4,904,727 A | | 2/1990 | Probst et al. |
| 5,021,469 A | | 6/1991 | Langerbeins et al. |
| 5,087,676 A | * | 2/1992 | Heider et al. .................. 526/93 |
| 5,756,574 A | | 5/1998 | Baumstark et al. |
| 5,994,457 A | | 11/1999 | Stanger et al. |

FOREIGN PATENT DOCUMENTS

| | | |
|---|---|---|
| GB | 1 272 584 | 5/1972 |
| WO | WO 95/30697 | 11/1995 |

* cited by examiner

Primary Examiner—D. R. Wilson
(74) Attorney, Agent, or Firm—Oblon, Spivak, McClelland, Maier & Neustadt, P.C.

(57) ABSTRACT

A process is described for effectively reducing the residual monomer content of an aqueous polymer dispersion by aftertreatment at atmospheric pressure or above with an initiator system comprising a) a hydroperoxide, hydrogen peroxide or a peracid, and b) an α-hydroxy carboxylic acid, such as tartaric acid, or with a salt thereof.

10 Claims, No Drawings

METHOD OF REDUCING THE CONTENT OF RESIDUAL MONOMERS IN AQUEOUS POLYMER DISPERSIONS

The invention relates to a process for reducing the residual monomer content of aqueous polymer dispersions by chemical aftertreatment with a special redox initiator system.

Following their preparation by free-radical polymerization or copolymerization, aqueous polymer dispersions include not only a polymer solids fraction of from 30 to 75% by weight but also, owing to the incomplete polymerization of the monomers employed in the free-radical main polymerization, which is usually carried out to a monomer conversion of 95 and preferably 98–99% by weight, an unwanted fraction of unbonded free monomers (residual monomers). On mainly toxicological grounds the market requires aqueous polymer systems having a low content of low molecular mass constituents with no change in processing and use properties.

Physical deodorization of a monomer-containing polymer dispersion to reduce the residual monomer content often places high demands on the process technology and on the stability of the polymer dispersions, and so is not generally applicable.

There are known methods of reducing the content of residual monomers in aqueous polymer systems by adding nucleophiles which form adducts with the monomers. U.S. Pat. No. 4,278,582, for example, discloses the addition of amino or thiol compounds to styrene-butadiene-acrylonitrile copolymer dispersions, and GB 1 272 584 the addition of hydrazine, in order to reduce the monomer content. Disadvantages with these methods are that the adduct-forming agents usually have to be employed in excess, that the agents are often electrolytes, or that the agents often remain as volatile constituents in the polymer dispersions. It is also possible in some cases (cf. eg. DE-A 29 19 096) for some of the adducts formed with the monomers to break back down into the starting materials, thereby increasing the content of residual monomers again.

It is also known to carry out an aftertreatment at polymerization temperature following addition of initiators in order to reduce the content of residual monomers, and redox initiators in particular are used for this purpose. In this case particular importance attaches to the nature of the reducing agent used in the redox initiator system. EP-A 379 892 and DE-A 38 34 734 disclose the use of Rongalit C (the Na salt of hydroxy-methanesulfinic acid) as a reduction component in the redox initiator system for such an aftertreatment. A disadvantage is that formaldehyde is readily formed in the course of the postpolymerization. When acetone bisulfite is used as the reducing agent for this, as described in U.S. Pat. No. 4,360,632 and DE-A 44 19 518, acetone may be released again during the reaction. For the postpolymerization of polymer dispersions, DE-A 44 35 422 recommends redox initiators with formamidine-sulfinic acid as reducing component. Disadvantages with this, however, are its limited solubility in water and the instability of its aqueous solutions in contact with air, which hinders its industrial handling. The use of reducing sugars such as glucose, of ascorbic acid or isoascorbic acid as component in the redox initiators can lead to instances of discoloration.

It is an object of the present invention to reduce the residual monomer content in aqueous polymer systems without forming further volatile or odoriferous constituents or microcoagulum. The intention is also that the reduction of the residual monomer content should be easy to utilize industrially, being suitable for use even in concentrated systems, for example.

We have found that this object is achieved and thus that the content of residual monomers in the aqueous polymer system can be effectively reduced if the aftertreatment of the aqueous polymer dispersions comprising residual monomers is conducted with heating and addition of a redox initiator system essentially comprising.

a) from 0.01 to 5, preferably from 0.05 to 2, % by weight, based on the overall amount of monomer used to prepare the polymer dispersion, of a1) a compound $R^1$—OO—$R^2$,
where $R^1$ and $R^2$ are hydrogen, a $C_1$–$C_8$-alkyl or a $C_6$–$C_{12}$-aryl and are identical or different, with the proviso that at least one of $R^1$ and $R^2$ is hydrogen, and/or a2) a compound which in aqueous medium releases hydrogen peroxide, and b) from 0.01 to 30, preferably from 0.05 to 5,% by weight, based on the overall amount of monomer used to prepare the polymer dispersion, of an organic α-hydroxy carboxylic acid,
where the hydroxyl is preferably part of a hydroxymethine group (CH(OH)) and the acid contains no polymerizable, olefinically unsaturated C—C double bond, or of a salt thereof, c) from 0 to 1000, preferably $\leq 100$ and, in particular, from 10 to 100 ppm, based on the overall amount of monomer used to prepare the polymer dispersion, of a multivalent metal ion which is able to change its valence state, wherein said initiator system contains no vanadium ions.

Particularly suitable α-hydroxy carboxylic acids (reducing component) are aliphatic hydroxy carboxylic acids of preferably 2 to 8 carbons, such as glycolic acid (hydroxyacetic acid), glyoxylic hydrate (dihydroxyacetic acid), lactic acid (2-hydroxypropionic acid), glyceric acid (2,3-dihydroxypropionic acid), malic acid (2-hydroxysuccinic acid) or tartronic acid (2-hydroxymalonic acid). Preference is given to the use of tartaric acid.

Both optical isomers and the racemate are equally effective. The chemical deodorization system of the invention is notable for the fact that when added under suitable reaction conditions it brings about a reduction in the amount of olefinically unsaturated compounds (residual monomers) without producing further volatile compounds in the form of byproducts and without the formation of coagulum as the result of an addition of electrolyte.

The oxidizing agent of the redox initiator system (component a)) should be in a position to form free radicals. In a further embodiment it is also possible for some or all of the combination of oxidizing agent and reducing agent to be replaced by a peracid. Oxidizing agents employed in the redox system are preferably hydrogen peroxide, but also potassium peroxide, sodium peroxide, sodium perborate and other precursors which in water form hydrogen peroxide. Other suitable oxidizing agents are tert-butyl hydroperoxide, cumene hydroperoxide, ammonium, potassium or sodium persulfate, peroxodisulfuric acid and salts thereof, ammonium, potassium or sodium perphosphate or diperphosphate, potassium permanganate and other salts of peracids. An initiator system which has proven particularly effective is the combination of tartaric acid and hydrogen peroxide with iron(II) sulfate as catalyst.

The amount of redox initiator system added is preferably in the range from 0.01 to 10% by weight, in particular from 0.01 to 5% by weight, based on monomers employed.

In general, the redox initiator system used for the aftertreatment of the invention is different from the initiator system used for the main polymerization of the monomers. The components of the initiator system used in accordance with the invention for the aftertreatment are judiciously metered in gradually, simultaneously or in succession (the oxidizing agent preferably being added first in the latter case) over a period of ½ to 5 hours with stirring and at atmospheric or superatmospheric pressure, to the polymer dispersion which is heated at about 20 to 150 and, in particular, 60 to 120° C. The initiator components can be added, for example, from above, from below or through the side of the reactor. Preferred stirrers in this context are anchor stirrers and blade stirrers. The dispersed polymers preferably have a particle size of from 50 to 400 nm and a monomodal or broad distribution.

As indicated, the initiator systems added in the aftertreatment of the polymer dispersions may also include multivalent metal ions which are able to change their valence state. These ions have a catalytic effect and assist electron transfer reactions. Very suitable for this purpose are iron, copper, manganese, nickel, cerium, chromium, platinum and palladium ions, of which iron and manganese ions are preferred. The addition of bases is often judicious for adjusting the pH of the polymer dispersion to an appropriate level. Suitable bases are aqueous sodium hydroxide solution, aqueous ammonia and triethanolamine. For the aftertreatment of the invention the pH of the polymer dispersion is preferably less than 8, more preferably 5–7. The pH can also, in principle, be in the basic range, although this is associated with disadvantages. For instance, hydrogen peroxide is unstable in the basic range, the acid is in salt form and hence exclusively in the aqueous phase, and the catalytic metal ions are converted to fairly insoluble hydroxides or hydroxo complexes. The establishment of higher pH values is therefore only sensible in special circumstances, for example under complexing conditions.

The process of the invention is particularly suitable for reducing the amount of residual monomer in aqueous dispersions of copolymers of acrylates and methacrylates (esters of acrylic or methacrylic acid with $C_1$–$C_{12}$-alkanols, especially $C_1$–$C_8$-alkanols, with particular preference being given to methyl, ethyl, n-butyl and 2-ethylhexyl acrylate and methacrylate), of styrene, such as styrene-butadiene or styrene-(meth)acrylate copolymers, and vinyl acetate copolymers, such as ethylene-vinyl acetate copolymers. In addition to the principal monomers the monomer mixtures used for the polymerization may also include in smaller amounts, preferably in amounts of from 0.01 to 10% by weight of the overall amount of monomer, polar monomers such as acrylic acid, methacrylic acid, acrylonitrile, maleic acid or its anhydride or hydroxyalkyl (meth)acrylates.

The preparation of the aqueous polymer dispersions aftertreated in accordance with the invention is known to the skilled worker (cf. eg. Encyclopedia of Polymer Science and Engineering, Vol. 8, (1957) 659 ff.; D. C. Blackley in High Polymer Latices, Vol.1, (1966) 35 ff.; F. Hölscher, Dispersionen synthetischer Hochpolymerer, Springer-Verlag Berlin (1969)). It is carried out by emulsion polymerization of the olefinically unsaturated monomers in the presence of a preferably water-soluble polymerization initiator, in particular a redox initiator, and in the presence of emulsifiers, with or without protective colloids and customary further additives. In general, the monomers in this case are added by continuous feed. As initiator, it is preferred to use peroxodisulfuric acid and/or its salts in amounts of from 0.1 to 2% by weight, based on the overall amount of the monomers. The polymerization is generally conducted at from 20 to 150° C. and preferably at from 60 to 120° C., at atmospheric pressure or above. Emulsifiers used are, in particular, anionic emulsifiers alone or in a mixture with nonionic dispersants in an amount of especially from 0.5 to 6% by weight of the overall amount of monomer.

The aftertreatment of the aqueous polymer dispersion that is carried out in accordance with the invention to reduce the residual monomer content is conducted in particular after at least 95 and preferably at least 98 to 99% by weight conversion of the overall amount of monomer in the main polymerization. The conditions in the case of the main polymerization and the aftertreatment are generally different. While in the case of the main polymerization, with a high concentration of monomers and of growing and hence more and more hydrophobic oligomer radicals, the entry of radicals into the dispersion particles occurs readily, such entry is very difficult in the case of the aftertreatment, owing to the low monomer concentration and the lack of growing and hence increasingly hydrophobic oligomer radicals. Radical decomposition in the course of aftertreatment in the aqueous phase of the dispersion is of no great effect for the desired reduction in hydrophobic residual monomers, since in the absence of water-soluble residual monomers these hydrophobic residual monomers predominantly combine to form unreacted products or are consumed by side reactions. Owing to the fundamental difference between the main polymerization and the aftertreatment, the prior art relating to the main polymerization will be dealt with only briefly.

Thus PCT application WO 95/30697 specifies peracids as suitable polymerization regulators in free-radical (main) polymerizations. DE-A 30 37 967 describes formic acid as chain transfer agent in the solution polymerization of water-soluble monomers, ie. it recommends its use in the (main) solution polymerization for lowering the molecular weight. This is certainly not the task of the aftertreatment of the invention. DE-A 37 18 520, furthermore, discloses using a combination of hydrogen peroxide with lactic acid as initiators for the emulsion polymerization of monomers, for producing sizes. The residual monomers and solvents present are subsequently removed by distillation. EP-A 249 786 describes the use of an initiator solution of hydrogen peroxide and isoascorbic acid for the emulsion copolymerization of styrene and acrylonitrile. The resulting emulsion copolymers are subsequently hydrolyzed with sodium hydroxide solution at 185° C. in an autoclave for five hours to form water-soluble copolymers. In JP-A 08127605 the main polymerization is initiated with hydrogen peroxide and tartaric acid but then, in the aftertreatment, residual monomers are depleted using 2,2'-azobis(2-methylpropionamidine) dihydrochloride. In DE-A 37 18 520, hydrogen peroxide and lactic acid are the initiators in the main polymerization, but in the aftertreatment the residual monomers are depleted with a combination of tert-butyl peroxide and the Na salt of hydroxymethanesulfinic acid. This prior art in no way suggests the use of the initiator systems of the invention for aftertreating a polymer dispersion to reduce residual monomers.

The residual monomer levels (in ppm) stated in the examples below were determined by gas chromatography.

The solids content (SC) was determined by gravimetry after drying. The LT value is the light transmittance of a 0.01% strength by weight sample of the corresponding polymer dispersion over a path length of 25 mm in comparison with pure water. Unless stated otherwise, parts and percentages are by weight.

EXAMPLE 1

An aqueous polymer dispersion was prepared by free-radical main polymerization, using sodium peroxodisulfate as initiator, from a mixture with the following composition: 250 g of n-butyl acrylate, 230 g of styrene, 10 g of acrylic acid, 4 g of styrene seed latex (34% in water, particle size approximately 30 to 35 nm), 0.5 g of sodium lauryl sulfate (15% strength in water), 2 g of Dowfax 2A1, 2 g of sodium peroxodisulfate and 480 g of water. In the main polymerization the monomer emulsion was supplied to the reactor as a feed over 3½ hours and then polymerization was completed at the polymerization temperature of 80° C. for one hour. The resulting copolymer dispersion had a solids content of 51% and a pH of 3.4, It had a residual monomer content of 5726 ppm of n-butyl acrylate and 449 ppm of styrene.

Aftertreatment in accordance with the invention: for the aftertreatment, iron(II) sulfate solution (0.01%, based on the overall amount of monomer used to prepare the polymer dispersion) was added to the polymer dispersion, and the pH was adjusted to 7 with sodium hydroxide solution. Then the two redox components [a) a 20% strength aqueous solution of hydrogen peroxide as oxidizing agent and b) a 30% strength aqueous solution of tartaric acid as reducing agent] were metered separately at 85° C. into the polymer dispersion at a rate of 10 ml per hour. After three hours of feeding in both redox components, a reduction in the residual monomer content to 63 ppm of n-butyl acrylate (99% reduction based on the initial value) and 5 ppm of styrene (99% reduction based on the initial value) was achieved.

EXAMPLE 2

An aqueous polymer dispersion was prepared by free-radical main polymerization using 0.3 g of sodium persulfate and 0.4 g of ascorbic acid and 0.01 g of iron(II) sulfate from a mixture with the following composition:

440 g of n-butyl acrylate, 50 g of acrylonitrile, 13 g of acrylic acid, 2.5 g of sodium hydroxide solution (25% strength in water), 10 g of emulsifier Em1, 13 g of emulsifier Em2 and 980 g of water. Emulsifier Em1 was a 20% strength solution of an octylphenol ethoxylated with 25 mol of ethylene oxide. Emulsifier Em2 was a neutralized and sulfated nonylphenol ethoxylated with 25 mol of ethylene oxide.

The polymer dispersion prepared by feeding in the monomer emulsion for 3.5 hours and subsequent reaction at the polymerization temperature of 85° C. for one hour had a solids content of 54% and a residual monomer content of 9609 ppm of n-butyl acrylate and 360 ppm of acrylonitrile. The pH was 7.

Aftertreatment in accordance with the invention: for the postpolymerization (chemical deodorization) the two redox components—a) a 10% strength aqueous solution of hydrogen peroxide and b) a 22% strength aqueous solution of tartaric acid —were metered separately at a rate of 10 ml/hour each, at a pH of 7 and at 85° C. into the $1.8 \times 10^{-4}$ mol/l iron(II) sulfate-containing polymer dispersion. After 3 hours of feeding the two components a reduction in the residual monomer content to 47 ppm of n-butyl acrylate (99.5% reduction based on the initial value) and 5 ppm of acrylonitrile (98.6% reduction based on the initial value) was found.

EXAMPLE 3

Free-radical main polymerization with sodium peroxodisulfate as initiator was used to convert a mixture comprising butadiene, styrene, acrylic acid, emulsifier and water into an aqueous polymer dispersion having a residual monomer content of 1533 ppm of styrene.

Aftertreatment in accordance with the invention: for the aftertreatment the two redox components [a) a 10% strength aqueous solution of hydrogen peroxide and b) a 22% strength aqueous solution of tartaric acid] were metered at a rate of 10 ml/hour each, at a pH of 7 and at 85° C. into the $1.8 \times 10^{-4}$ mol/l iron(II) sulfate-containing polymer dispersion. After 3 hours of feeding the two components a reduction in the residual monomer styrene to 5 ppm (99.7% reduction based on the initial value) was achieved. The residual amount of acrylic acid was below the detection limit (<10 ppm).

We claim:

1. A process for reducing the amount of residual monomer in an aqueous polymer dispersion prepared by free-radical polymerization, comprising:

conducting an aftertreatment in the aqueous polymer dispersion which is heated to 60 to 120° C.; and adding of an initiator system which consists essentially of a) from 0.01 to 5% by weight, based on the overall amount of monomer used to prepare the polymer dispersion, of a1) a compound $R^1$—OO—$R^2$, where $R^1$ and $R^2$ are hydrogen, a $C_1$-$C_8$-alkyl or a $C_6$-$C_{12}$-aryl and are identical or different, with the proviso that at least one of $R^1$ and $R^2$ is hydrogen, and/or a2) a compound which in aqueous medium releases hydrogen peroxide, and b) from 0.01 to 30% by weight, based on the overall amount of monomer used to prepare the polymer dispersion, of an organic α-hydroxy carboxylic acid, which contains no polymerizable, olefinically unsaturated C—C double bond, or of a salt thereof, and c) from 10 to 1000 ppm by weight, based on the overall amount of monomer used to prepare the polymer dispersion, of a multivalent metal ion selected from the group consisting of an iron ion, a copper ion, a manganese ion, a nickel ion, a cerium ion, a chromium ion, a platinum ion and a palladium ion;

wherein said initiator system contains no vanadium ions.

2. A process as claimed in claim 1, wherein all or some of the compound b) is replaced by a salt thereof.

3. A process as claimed in claim 1, wherein component a) is hydrogen peroxide.

4. A process as claimed in claim 1, wherein the hydroxyl of the α-hydroxy carboxylic acid is part of a hydroxymethine group (CH(OH)).

5. A process as claimed in claim 4, wherein the α-hydroxy carboxylic acid is tartaric acid or a salt thereof.

6. A process as claimed in claim 1, wherein multivalent metal ions used are $Fe^{2+}$ or $Mn^{2+}$ ions.

7. The process according to claim 1, wherein an amount of component a) in said initiator system is 0.05 to 2% by weight based on the total weight of monomers used to prepare the polymer dispersion.

8. The process according to claim 1, wherein an amount of component b) in said initiator system is 0.05 to 5% by weight based on the total weight of monomers used to prepare the polymer dispersion.

9. The process according to claim 1, wherein an amount of component c) in said initiator system is 10 to 100 ppm by weight based on the total weight of monomers used to prepare the polymer dispersion.

10. The process according to claim 1, wherein said aqueous polymer dispersion is heated to 60 to 120° C.

* * * * *